United States Patent [19]

Yao et al.

[11] Patent Number: 5,326,380
[45] Date of Patent: Jul. 5, 1994

[54] SYNTHESIS OF POLYCRYSTALLINE CUBIC BORON NITRIDE

[75] Inventors: Xian Yao, Orem; Ghanshyam Rai, Sandy, both of Utah

[73] Assignee: Smith International, Inc., Houston, Tex.

[21] Appl. No.: 966,698

[22] Filed: Oct. 26, 1992

[51] Int. Cl.$^5$ ............................................. B24D 3/00
[52] U.S. Cl. .................................. 51/293; 51/309; 501/87; 501/96
[58] Field of Search .................. 51/293, 309; 501/87, 501/96

[56] References Cited

U.S. PATENT DOCUMENTS

| | | | |
|---|---|---|---|
| 3,918,219 | 11/1975 | Wentorf, Jr. et al. | 51/293 |
| 3,944,398 | 3/1976 | Bell | 51/309 |
| 4,016,244 | 4/1977 | Susa et al. | 423/290 |
| 4,334,928 | 6/1982 | Hara et al. | 51/309 |
| 4,342,595 | 8/1982 | Bourdeau | 75/238 |
| 4,343,651 | 8/1982 | Yazu et al. | 75/238 |
| 4,389,465 | 6/1983 | Nakai et al. | 51/309 |
| 4,394,170 | 7/1983 | Sawaoka et al. | 75/233 |
| 4,566,905 | 1/1986 | Akashi et al. | 75/244 |
| 4,590,034 | 5/1986 | Hirano et al. | 419/13 |
| 4,596,693 | 6/1986 | Izhizuka et al. | 419/16 |
| 4,619,698 | 10/1986 | Ueda et al. | 75/238 |
| 4,647,546 | 3/1987 | Hall, Jr. et al. | 501/96 |
| 4,650,776 | 3/1987 | Cerceau et al. | 501/96 |
| 4,693,746 | 9/1987 | Nakai et al. | 75/238 |
| 4,837,089 | 6/1989 | Araki et al. | 428/552 |
| 4,883,648 | 11/1989 | Davies et al. | 423/290 |
| 4,911,756 | 3/1990 | Nakai et al. | 75/238 |
| 4,950,557 | 8/1990 | Nakai et al. | 428/698 |
| 5,015,265 | 5/1991 | Corrigan et al. | 51/293 |
| 5,034,053 | 7/1991 | Nakai et al. | 75/238 |
| 5,037,704 | 8/1991 | Nakai et al. | 428/550 |
| 5,043,120 | 8/1991 | Corrigan | 264/67 |

Primary Examiner—Mark L. Bell
Assistant Examiner—Willie J. Thompson
Attorney, Agent, or Firm—Christie, Parker & Hale

[57] ABSTRACT

A sintered polycrystalline compact of cubic boron nitride is made by first forming a mixture of about 30 to 60 percent by weight cubic boron nitride, up to about 50 percent by weight hexagonal boron nitride, and from about 2 to 7 percent by weight adjuvant materials, or sintering aids, comprising an aluminum containing material selected from the group consisting of aluminum, aluminum nitride, or aluminum diboride, and up to 50 percent by weight of nitride, carbide, or carbonitride binder material containing a group IVb, Vb, or VIb transition metal. The mixture of cBN crystals, hBN and other materials is compacted into a preform and subjected to heat treatment in a non-oxidizing atmosphere. The preform is placed onto a cemented tungsten-carbide/cobalt substrate and subjected to elevated pressure and temperature conditions at which cubic boron nitride is thermodynamically stable. The elevated pressure and temperature conditions are maintained for a time sufficient to permit the infiltration of the cobalt into the cBN matrix and sinter the compact. The compact is characterized by substantial intergranular cBN to cBN bonding, and has superior abrasive wear stability, chemical resistance, impact resistance and thermal conductivity.

16 Claims, No Drawings

SYNTHESIS OF POLYCRYSTALLINE CUBIC BORON NITRIDE

FIELD OF THE INVENTION

This invention relates to sintered polycrystalline abrasive compacts of cubic boron nitride for use as machining tools, abrasives, wire dies, wear parts, heat sinks, and the like. More particularly, this invention relates to a process of synthesizing polycrystalline cubic boron nitride composites by adding a certain amount of hexagonal boron nitride to cubic boron nitride crystals and utilizing cubic boron nitride crystals as nuclei and hexagonal boron nitride as precipitate and growth materials. The composition also uses a metal nitride, and a metal carbonitride as well as infiltrated liquid cobalt under high pressure and high temperature sintering conditions which are thermodynamically stable for the cubic boron nitride crystal structure.

BACKGROUND OF THE INVENTION

The high pressure forms of boron nitride, known as cubic boron nitride (cBN) and wurzitic boron nitride, are surpassed only by diamond in hardness and have a wide variety of uses as machining tools, abrasives, wire dies, wear parts, heat sinks, and the like.

Wurzitic boron nitride, typically formed by shock or explosive techniques, has a hardness equal to cBN and can be substituted or mixed with cBN in most applications. Wurzitic boron nitride, however, is thermodynamically unstable relative to cBN under conditions favorable to sintering and will revert to cBN in the presence of catalyst-solvents.

cBN, in particular, is preferred to diamond in working with ferrous metals because it is chemically more stable than diamond, has a higher temperature threshold for conversion to its hexagonal or graphitic form and is not catalytically degraded by hot ferrous metals, as is diamond. In the applications mentioned above, the primary qualities desired for a polycrystalline cBN compact tool are abrasive wear resistance, thermal stability, high thermal conductivity, impact resistance, and a low coefficient of friction in contact with the workpiece. While cBN itself possess each of these qualities to a significant degree, whether a polycrystalline compact of cBN as a whole possesses them will depend largely on the characteristics of the other materials that will make up the compact, i.e., binder material, catalysts, substrates, and the like, along with processing parameters such as particle surface cleanliness, grain size and the like.

Compacts having a lower concentration of cBN and a higher concentration of a nonmetallic adjuvant material have been favored for such applications. Although it is possible to form a sintered compact of cBN with no adjuvant material under conditions of high pressure and temperature, strongly adherent surface oxides of boron act to inhibit significant intergranular bonding and make it difficult, if not impossible, to obtain an adequate compact strength. Various adjuvant materials are thus incorporated, either to enhance intergranular bonding or to surround the grains with a continuous somewhat less brittle matrix, producing a stronger cBN compact. The adjuvant material may also impart other desirable physical characteristics to the compact such as chemical resistance and impact resistance depending on the particular adjuvant material chosen. Additionally, the use of adjuvant materials helps to reduce the material cost associated with producing the cBN compact due to the decreased amount of cBN crystals required as a starting material.

The adjuvant materials chosen should possess two general sets of qualities; (1) mechanical and chemical properties as close to those of cBN as possible, so as not to deteriorate tool performance, and (2) characteristics enabling manufacture of the compact, such as a melting point at readily obtainable temperatures or good plasticity at such temperatures, limited but not excessive chemical reactivity towards cBN, and most preferably, catalytic-solvent activity for conversion of hexagonal boron nitride to cBN. This latter characteristic will facilitate crystalline growth and intergranular bonding under conditions of pressure and temperature at which cBN is thermodynamically stable.

The use of adjuvant materials as catalyst-solvents for conversion of hexagonal boron nitride to cBN are disclosed in the prior art. U.S. Pat. No. 3,918,219 to Wentorf discloses a method for converting hexagonal boron nitride to cubic boron nitride in the presence of catalyst material. Hexagonal boron nitride (hBN) is the low pressure graphitic powder form of boron nitride. hBN alone, under conditions of elevated temperature and pressure does not form a sintered polycrystalline cBN compact containing the necessary physical properties to be useful as a machining tool. Instead, hBN forms a weakly intergranular bonded cBN structure having a high degree of interstitial voids that tends to exfoliate. However, hBN can be used as a suitable starting material and will yield a desirable compact if a limited amount is combined with cBN crystals and an adjuvant material.

The use of cBN crystals as a starting material is known in the art. U.S. Pat. No. 4,647,546 to Hall discloses a process for making a polycrystalline cBN compact by combining cBN with suitable adjuvant materials. cBN is indispensable for imparting the excellent properties of abrasive were resistance and chipping resistance to the high pressure high temperature sintered compact. Further, cBN crystals act as nucleation sites when combined with hBN and adjuvant materials to facilitate the formation of the polycrystalline cBN structure during sintering.

Aluminum containing materials have certain desirable properties which have led to their use, separately, in prior art compositions. Use of aluminum as an aid in bonding cBN under high pressure, temperature conditions is taught by U.S. Pat. No. 3,944,398 to Bell. Bell teaches the use of a material consisting of a boride, nitride, or silicide refractory substance and a solvent of aluminum, lead, tin, magnesium, lithium, or alloys thereof. The preferred embodiment of Bell, employs silicon nitride as the second refractory substance and aluminum as the solvent. Bell teaches that substantially all of the aluminum reacts with the silicon nitride to form aluminum nitride. The resulting cBN compact displays good thermal stability, enhanced impact resistance and performs well in aggressive cutting operations of hard ferrous alloys. However, the large amount of binder materials used, which are considerably softer than cBN, tended to interfere with intergranular cBN to cBN bonding and adversely affected the abrasive wear resistance of the sintered cBN compact.

Another hard material used in combination with cBN is one selected from a carbide, nitride, or carbonitride of a group IVb, Vb, and VIb transition metal of the periodic table. U.S. Pat. No. 4,334,928 to Hara discloses cBN compacts made with hard materials selected from carbides, nitrides, carbonitrides, borides, and silicides of the group IVb, Vb, and VIb transition metals. Hara also teaches that a catalyst such as aluminum and/or silicon, may be added to the composition in a small amount. The carbide, nitride, or carbonitride containing hard materials are chosen because of their ability to impart to the cBN compact enhanced chemical and impact resistance. The Hara patent neither intends nor achieves substantial direct cBN to cBn intergranular bonding, in part due to the low concentration of cBN. Accordingly, the low volume concentration of cBN and lack of substantial intergranular bonding produced a cBN compact having poor wear resistance in abrasive applications.

U.S. Pat. No. 4,619,698 to Ueda discloses very high pressure sintered compacts of cBN containing at least one metal selected from the group consisting of cobalt and nickel. The use of cobalt as a binder material has been shown to improve the degree of sintering of the CBN compact.

Although the prior art discloses the advantages of making a cBN compact using a variety of adjuvant materials, it does not disclose the process of combining these or other adjuvant materials in the appropriate amount to produce an improved sintered polycrystalline cBN compact. Further, the methods described in the prior art are not the most economically advantageous methods for making the cBN compact because of the excessive material cost associated with using a high proportion of cBN crystals as a starting material.

It is therefore highly desirable to provide a method for making a sintered polycrystalline cBN compact, comprising the use of various adjuvant materials that act to facilitate the conversion of hBN to cBN and enhance the strength and degree of intergranular cBN to cBN bonding of the polycrystalline cBN compact and impart to the sintered cBN compact the level of abrasive wear resistance, impact resistance, thermal conductivity and stability needed to perform as a cutting tool. It is also desirable that the method of making the polycrystalline cBN compact be cost effective in terms of starting material costs.

SUMMARY OF THE INVENTION

There is, therefore provided in the practice of this invention according to a preferred embodiment a method for preparing, at elevated temperature and pressure conditions a sintered polycrystalline compact of cubic boron nitride (cBN) from cBN crystals, hexagonal boron nitride powder and adjuvant materials.

cBN crystals having an average particle size less than about 5 micrometers are heat treated in a non-oxidizing atmosphere and combined with hBN and adjuvant materials. The hBN has an average particle size of less than about 10 micrometers and comprises in the range of from 30 to 60 percent by weight of the mixture. The other materials comprise (a) an aluminum containing material selected from the group consisting of aluminum, aluminum nitride, and aluminum diboride, preferably aluminum nitride having an average particle size of less than about 10 micrometers and comprising in the range of from 2 to 7 percent by weight of the mixture, and (b) a carbide, nitride, or carbonitride containing material selected from the group of IVb, Vb, and VIb transition metals, preferably titanium carbonitride having an average particle size of about 2 micrometers and comprising in the range of from 2 to 40 percent by weight of the mixture.

If desired, tungsten carbide (WC) may be added as a hard material up to about 2 percent by weight of the mixture.

The mixture is compacted into a preform and heat treated. The preform is placed onto a cobalt cemented tungsten carbide substrate and loaded into a protective container, which is placed into the working chamber of a suitable high pressure, high temperature apparatus and subjected to elevated pressure conditions in excess of 20 kbar, preferably to between about 50 and 75 kbar, and then to elevated temperature conditions, preferably to between 1200° and 1600° C. These conditions are in the region of cBN crystal stability, and provide melting of the cobalt contained in the cemented tungsten carbide substrate and the conversion of hBN to cBN. Elevated pressure and temperature are maintained for a period of between 5 and 20 minutes to sinter the cBN crystals, after which time the temperature and then the pressure are reduced and the compact recovered.

DETAILED DESCRIPTION

In the preferred embodiments of the invention, cubic boron nitride (cBN) crystals of a particle size suitable for the intended application of the compact are thoroughly blended with a powder of hexagonal boron nitride (hBN) and adjuvant material.

The preferred adjuvant materials include; (a) an aluminum containing material selecting from the group consisting of aluminum, aluminum nitride, aluminum diboride, or mixtures thereof, and (b) a carbide, nitride, or carbonitride containing material of the group IVb, Vb, and VIb transition metals from the periodic table.

In order to insure enhanced intergranular bonding it is preferred that the particle size of the adjuvant material be approximately equal to that of the cBN crystals. As finer-grained compacts give greater impact resistance, perform suitably in aggressive cutting applications, and give smoother surfaces in finishing applications, a cBN particle size less than about 5 micrometers is preferred. It is preferred that the hBN have a particle size less than about 10 micrometers, that the aluminum containing adjuvant material have a particle size of less than about 10 micrometers, and that the carbide, nitride or carbonitride containing hard material have a particle size less than about 2 micrometers.

The preferred amount of cBN comprising the total mixture of cBN, hBN and adjuvant material is in the range of from 30 to 60 percent by weight. The preferred amount of hBN comprising the total mixture is in the range of up to 50 percent by weight. The preferred ratio of cBN to hBN is about 2:1. A cBN ratio greater than 2:1 produces a mixture that is very difficult to preform due to the inherent hardness of the cBN itself. A cBN ratio less than 2:1 produces a compact having a greater metal phase which greatly decreases the compacts's abrasive wear resistance.

The preferred amount of other material present in the total mixture of cBN, hBN and adjuvant material is in the range of from 5 to 50 percent by weight. The preferred aluminum containing adjuvant material is aluminum nitride (AlN) and may comprise from about 2 to 7 percent by weight of the total mixture. The desired range of AlN contained in the mixture is believed to be stoichiometrically dependant on the amount of hBN. It is believed that hBN is nitrogen deficient and that the AlN provides additional nitrogen as well as removing some boron by forming aluminum diboride, thereby bringing the boron nitride closer to stoichiometric BN. This facilitates hBN to cBN conversion. A mixture having less than 2 percent by weight AlN may not yield a compact having a high hBN to cBN conversion. A mixture having greater than 7 percent, while having a high hBN to cBN conversion, produces a compact having, decreased abrasive wear resistance making the compact a less desirable cutting tool.

The preferred carbide, nitride, or carbonitride containing hard material of the group IVb, Vb, and VIb transition metals is titanium carbonitride Ti(C,N) and may comprise from about 2 to 40 percent by weight of the total mixture. Ti(C,N) imparts chemical resistance to the cBN compact and a compact having less than 2 percent by weight Ti(C,N) does not possess the chemical resistance needed to function as a desirable cutting tool. Because Ti(C,N) is relatively softer than cBN, a mixture comprising greater than 40 percent Ti(C,N) produces a compact having decreased abrasive wear resistance.

If desired, tungsten carbide (WC) may be added as a hard material up to about 2 percent by weight of the total mixture.

Before combining the cBN crystals with the hBN and adjuvant materials, the cBN crystals are heat treated in a non-oxidizing and preferably reducing atmosphere at a temperature of about 1000° C. for a duration of about 1 to 2 hours. The non-oxidizing atmosphere may either be $10^{-4}$ to $10^{-6}$ Torr vacuum, hydrogen or ammonia. The purpose of the initial heat treatment is to remove any adsorbed water vapor, oxides and other volatile impurities that may interfere with the intergranular cBN to cBN bonding.

The cBN crystals are combined with the powders of the hBN and the adjuvant materials in the preferred weight ratio and thoroughly blended together with tungsten-carbide balls and alcohol in a nitrogen charged ball or attritor mill. The mixture is compacted into preforms and heat treated in a non-oxidizing reducing atmosphere at a temperature in the range of from 600° to 1000° C. for a duration of about 4 hours. The non-oxidizing atmosphere may either be $10^{-4}$ to $10^{-6}$ Torr vacuum, hydrogen or ammonia. Preferably, the temperature of heat treatment of the preform is about 1000° C. for rapid reaction. If the temperature is less than about 600° C., boron oxide, $B_2O_3$, on the surface of hBN may not volatilize. On the other hand, if the temperature is more than about 1000° C., the aluminum nitride begins to vaporize.

Each preform is placed onto a cobalt cemented tungsten carbide substrate and the preform and substrate are loaded into a closed container. Careful selection of container materials will minimize infiltration of undesirable elements into the compact. While molybdenum, nickel, titanium, zirconium, tungsten, and stainless steel have been found to be suitable, the preferred container material is niobium. The closed niobium container enclosing the substrate and preform to be sintered is surrounded by any well known plastic pressure transmitting medium. The preferred pressure transmitting medium is a salt such as NaCl, however, hexagonal boron nitride, talc, etc. may also be utilized.

The container, surrounded by the pressure transmitting medium, is placed within a graphite or metallic heater, surrounded by a pressure transmitting and gasket forming medium such as pyrophyllite, and placed into a chamber of a suitable high pressure, high temperature apparatus. After pressure in excess of about 20 kbar is applied to bring the mixture into the region of cBN thermodynamic stability, which is well known to those skilled in the art, electrical resistance heating is applied to melt the adjuvant material, convert the hBN to cBN and sinter the compact to maximum density. The preferred sintering time at the preferred conditions of at least 50 kbar and at least 1200° C. is about 15 minutes.

After sintering is complete, the electric heating current is slowly removed and the sample is allowed to cool to below 200° C., after which the applied pressure is removed and the container is removed from the chamber. The compact is then recovered from the container and readied for use in its final form.

When the charge in the high pressure, high temperature press reaches the melting point of the cobalt rich phase in the cemented tungsten carbide, it melts and the liquid material infiltrates into the preform of cBN, hBN and adjuvant materials. It is believed that the aluminum bearing material, specifically aluminum nitride, along with a portion of the boron nitride dissolves in the cobalt-rich liquid phase. As temperature decreases, boron nitride precipitates in the cubic crystal structure.

While not wishing to be bound by any theory it is theorized that the excellent catalyst-solvent activity of the aluminum containing adjuvant material is a result of (1) dissolving in the cobalt rich phase significantly lower than the plastic flow point of cBN, providing for catalytic activation of the surfaces of the cBN grains prior to their complete compaction and enabling complete filing of pores for attainment of maximum density, (2) substantial wetting action for cBN, both as a result of reduction of surface oxides of boron by aluminum and because of the large difference between the melting temperature and the sintering temperature, and (3) significant solubility in the liquid alloy for boron and nitrogen as a result of the moderate chemical activity of the diluted aluminum atoms, thereby enabling reversible dissolution of boron nitride and recrystallization as cBN.

The carbide, nitride, or carbonitride containing hard material selected from the group IVb, Vb, and VIb transition metals is known to have high abrasive wear resistance, heat resistance and chemical resistance characteristics. However, the abrasive wear resistant qualities of this hard material does not surpass that of cBN alone. Accordingly, the weight percent of carbide, nitride, or carbonitride hard material used in the mixture reflects a tradeoff between the increased heat resistance and chemical resistance and the tendency to reduce cBN's inherent abrasive wear resistance. In practice, a mixture comprising less than about 50 percent by weight nitride, carbide, or carbonitride containing material produces a cBN compact having a reasonably high degree of chemical resistance, heat resistance and abrasive wear resistance suitable for finish machining operations.

In using the compact of the invention as a cutting tool, it is enough that the edge of the tool contains a hard and wear resistant layer comprising cBN and heat-resistant/wear-resistant hard material. Therefore, it is more advantageous to form a composite compact which comprises a polycrystalline cBN hard layer and a cemented carbide substrate integral with the former, in view of the cost and the strength of the tool. The thickness of the hard layer in the composite compact varies according to the operating conditions of the cutting tool as well as the shape thereof, but is generally more than 0.5 millimeters. For a cemented carbide substrate, a tungsten carbide cemented carbide is most preferable since it has a high hardness, heat conductivity and toughness. The thickness of the cemented carbide substrate is generally more than about 2.0 millimeters.

The preferred method of producing this complex compact is as follows. There is previously prepared a substrate alloy of a suitable shape from a cemented metal carbide such as tungsten carbide cemented with cobalt. A mixture of the cBN crystals, hBN and adjuvant material for forming a hard layer as an effective cutting edge is put on the substrate. The assembly is then hot-pressed by a super-pressure apparatus to sinter the cBN hard layer and at the same time to bond the polycrystalline cBN to the cemented carbide substrate. During the hot pressing, the cobalt containing liquid phase of the cemented carbide substrate infiltrates into the clearances between cBN particles, thus, forming a bond between the cBN compact and the tungsten carbide substrate.

The compact of the invention has polycrystalline cBN, a second phase which is a carbide, nitride, and carbonitride containing hard material of the group IVb, Vb, and VIb transition metals, and a third phase mainly composed of cobalt alloy containing residual adjuvant materials such as aluminum, aluminum nitride, and aluminum diboride. The hard materials have a lower rigidity than cBN, and more easily deform under super-pressures to form a densely compacted powder body before the appearance of the liquid phase. As a result, in the compact of the invention, there will occur only minimal permeation of the liquid phase of the cemented tungsten carbide substrate during hot pressing under super-pressures, which permeation may cause the composition of the hard layer to vary and the heat resistance thereof to be lower. Combining cBN, hBN and adjuvant materials as described produces a compact comprising about 25 percent by weight cobalt-rich phase which is highly desirable.

The following examples demonstrate the practice of preferred embodiments of the invention.

EXAMPLE 1 cBN crystals, having an average particle size of about 3 micrometers, were heat treated in an ammonia atmosphere at 1000° C. for 1½ hours. The cBN crystals were then intimately mixed with hBN powder having an average particle size of about 8 micrometers, titanium carbonitride powder having an average particle size of less than about 2 micrometers, aluminum nitride (AlN) powder having an average particle size of about 8 micrometers, and tungsten carbide (WC) powder having an average particle size of less than about 1 micrometer.

The cBN crystals, hBN powder and these three adjuvant materials were combined in the weight ratio of 50:35:8:5:2 and thoroughly mixed with tungsten carbide balls and alcohol in a nitrogen charged mill. The mixture was compacted into preforms having the approximate shape of the sintered cBN compact tool. The preforms were subjected to a preform heat treatment at about $10^{-4}$ to $10^{-6}$ Torr vacuum and about 1000° C. for about 4 hours. Each preform was placed onto a cemented tungsten-carbide/cobalt substrate and both were loaded into a closed niobium container.

The closed container was surrounded with a NaCl pressure-transmitting medium, loaded into a pyrophyllite cell and subjected to high pressure at about 75 kbar and high temperature at about 1400° C. to 1500° C. After maintaining the temperature for approximately 15 minutes, the load was allowed to cool and then the pressure was reduced. A microstructural analysis on the polished surface revealed a complete conversion of hBN to cBN and excellent cBN to cBN intercrystalline bonding. Micro hardness on the polycrystalline cBN layer was measured to be 3000 to 3200 Kg/mm$^2$ using the Vickers test method.

EXAMPLE 2 cBN crystals having an average particle size of about 1.5 micrometers were mixed with hBN, titanium carbonitride, aluminum nitride, and tungsten carbide powders at the weight percent ratios listed in Table 1.

TABLE 1

| Test No. | Cubic Boron Nitride (cBN) | Hexagonal Boron Nitride (hBN) | Aluminum Nitride (AlN) | Titanium Carbo-Nitride [Ti(C,N)] | Tungsten Carbide (WC) | Heat Treatment Atmosphere |
|---|---|---|---|---|---|---|
| 1 | 57 | 0 | 40 | 2 | 1 | Vacuum |
| 2 | 57 | 0 | 38.5 | 3.5 | 1 | Hydrogen |
| 3 | 57 | 0 | 37 | 5 | 1 | Ammonia |
| 4 | 34 | 23 | 40 | 2 | 1 | Ammonia |
| 5 | 34 | 23 | 38.5 | 3.5 | 1 | Vacuum |
| 6 | 34 | 23 | 37 | 5 | 1 | Hydrogen |

Tests 1–3 cBN crystals having an average particle size of about 1.5 micrometers were combined with the adjuvant materials at the weight percent ratios listed in Table 1. The mixture was blended in the same manner as described in Example 1 and subjected to a heat treatment at about 1000° C. for about 4 hours in a $10^{-4}$ to $10^{-6}$ Torr vacuum, ammonia, or hydrogen atmosphere as listed in Table 1. The mixture was placed onto a cemented tungsten-carbide/cobalt substrate and both were loaded into a high pressure and high temperature cell as described in Example 1. The sealed load was subjected to high pressure at about 60 kbar and a high temperature at about 1400° to 1500° C. for approximately 15 minutes.

Tests 4–6 cBN crystals, hBN and the adjuvant materials were combined in the weight percent ratios listed in Table 1. The mixture was blended in the same manner as described in Example 1 and subjected to a heat treatment at about 1000° C. for about 4 hours in a $10^{-4}$ to $10^{-6}$ Torr vacuum, ammonia, or hydrogen atmosphere as listed in Table 1. The mixture was then compacted into preforms and subjected to a second heat treatment at identical conditions. After the heat treatment each preform was placed into a cemented tungsten-carbide/cobalt substrate and then loaded into a high pressure and high temperature cell. The cell was subjected to a high pressure at about 60 kbar and a high temperature at about 1400° to 1500° C. for 15 minutes.

For Tests 1–6, completely bonded structures were observed on the polished surfaces of thus obtained blanks. The Vickers hardness value measured between 2700 and 3000 Kg/mm$^2$.

EXAMPLE 3 cBN crystals having an average diameter of about 1.5 micrometers were mixed with hBN, titanium carbonitride, aluminum nitride, and tungsten carbide in the weight percent ratio shown in Table 2. cBN crystals were combined and blended with hBN and the adjuvant materials in the same manner as described in Example 1. For each test the mixture of cBN, hBN and adjuvant materials was subjected to an initial heat treatment in $10^{-4}$ to $10^{-6}$ Torr vacuum, ammonia, or hydrogen atmosphere at a temperature of about 1000° C. for about 4 hours. The mixture was then compacted into preforms and subjected to yet another identical heat treatment process. The preforms were placed onto a cemented tungsten-carbide/cobalt substrate and loaded into a high pressure, high temperature cell. The sealed load was surrounded with a NaCl pressure-transmitting medium, loaded into a pyrophyllite cell and then subjected to high pressure at about 60 kbar and a temperature above 1300° C. for about 15 minutes.

TABLE 2

| Test No. | Cubic Boron Nitride (cBN) | Hexagonal Boron Nitride (hBN) | Aluminum Nitride (AlN) | Titanium Carbo-Nitride [Ti(C,N)] | Tungsten Carbide (WC) | Heat Treatment Atmosphere |
|---|---|---|---|---|---|---|
| 1 | 53 | 39 | 5 | 2 | 1 | Hydrogen |
| 2 | 53 | 39 | 3.5 | 3.5 | 1 | Ammonia |
| 3 | 53 | 39 | 2 | 5 | 1 | Vacuum |

These tests revealed a completely sintered structure of cBN to cBN crystal bonding with an interstitial second ceramic phase. These blanks exhibited Vickers hardness values of about 3000 Kg/mm$^2$.

The resulting compacts have a substantially continuous cBN crystalline matrix possessing advantageous qualities not found simultaneously in the prior art; namely, (1) a high volume cBN concentration with strong intergranular cBN to cBN bonding, resulting in high resistance to binder erosion by abrasive materials, (2) high thermal conductivity, together with (3) high wear resistance under aggressive conditions in cutting of ferrous alloys, (4) high thermal stability, (5) low coefficient of friction versus ferrous metals, (6) lack of chemical or metallurgical reaction with the workpiece, and (7) good impact resistance. This method of making the polycrystalline cBN compact is also economically advantageous because it results in high hBN to cBN conversion. The use of hBN as a starting material reduces the amount of higher priced cBN crystals needed as the starting material.

It is possible within the scope of this invention to practice a wide variety of compositions, adjuvant materials, and temperature and pressure conditions in cycles which will achieve the same objective as these examples, and the foregoing examples are designed to be illustrative rather than limiting. For example, while cubic boron nitride is the preferable high pressure boron nitride phase, the invention also may be carried out using wurzitic boron nitride or a mixture of cubic and wurzitic boron nitride as a starting material. Additionally, a small amount of tungsten carbide may be used as hard material. Since many such variations may be made, it is to be understood that within the scope of the following claims, this invention may be practiced otherwise than specifically described.

What is claimed is:

1. A process for preparing a sintered polycrystalline compact with substantial intercrystalline bonding from high pressure boron nitride which comprises:
    mixing grains of high pressure boron nitride with grains of a low pressure boron nitride, an aluminum containing adjuvant material, and a carbide, nitride, or carbonitride containing hard material;
    subjecting the resulting mixture to elevated temperature in a non-oxidizing environment;
    placing the mixture onto a cemented tungsten-carbide/cobalt substrate;
    loading the mixture and substrate into a closed container;
    subjecting the closed container to elevated temperature and pressure conditions sufficient to melt cobalt from the substrate, and at which conditions the high pressure boron nitride is thermodynamically stable; and
    maintaining the elevated temperature and pressure conditions for a time sufficient to allow for substantial intercrystalline bonding to thereby sinter the compact.

2. The process as recited in claim 1 wherein the high pressure boron nitride is cubic boron nitride.

3. The process as recited in claim 2 wherein the mixture contains in the range of from 30 to 60 percent by weight cubic boron nitride.

4. The process as recited in claim 1 wherein the aluminum containing adjuvant material is at least one material selected from the group consisting of aluminum, aluminum nitride, and aluminum diboride.

5. The process as recited in claim 4 wherein the selected aluminum containing adjuvant material is aluminum nitride.

6. The process as recited in claims 5 wherein the mixture contains in the range of from 2 to 7 percent by weight aluminum nitride.

7. The process as recited in claim 1 wherein the carbide, nitride, or carbonitride containing hard material is at least one material selected from the group of carbides, nitrides, and carbonitrides of group IVb, Vb and VIb transition metals from the periodic table.

8. The process as recited in claim 7 wherein the selected carbide, nitride, or carbonitride containing hard material is titanium carbonitride.

9. The process as recited in claim 8 wherein the mixture contains in the range of from 2 to 40 percent by weight titanium carbonitride.

10. The process as recited in claim 1 wherein the low pressure boron nitride material is hexagonal boron nitride.

11. A process for preparing a sintered polycrystalline cubic boron nitride compact comprising the steps of:

mixing cubic boron nitride crystals with hexagonal boron nitride, an aluminum containing adjuvant material selected from the group consisting of aluminum, aluminum nitride, and aluminum diboride, and a carbide, nitride, or carbonitride containing hard material of group IVb, Vb and VIb transition metals from the periodic table;

compacting the mixture into a preform;

subjecting the preform to an elevated temperature;

placing the preform onto a cemented tungsten-carbide/cobalt substrate;

subjecting the preform and substrate to elevated temperature and pressure conditions sufficient to melt cobalt-rich phase in the substrate, at which conditions the cubic boron nitride is thermodynamically stable, whereby the cobalt infiltrates the mass of cubic boron nitride crystals causing intercrystalline bonding; and maintaining the elevated conditions for a time sufficient to allow for substantial intercrystalline bonding to thereby sinter the compact.

12. The process as recited in claim 11 wherein the mixture comprises in the range of from 2 to 7 percent by weight aluminum containing adjuvant material.

13. The process as recited in claim 11 wherein the mixture comprises in the range of from 2 to 40 percent by weight nitride, carbide, or carbonitride containing hard material.

14. The process as recited in claim 11 wherein the mixture comprises in the range of from 30 to 60 percent by weight cubic boron nitride.

15. The process as recited in claim 1 wherein the weight ratio of high pressure boron nitride to hexagonal boron nitride is approximately 2:1.

16. The process as recited in claim 11 wherein the weight ratio of cubic boron nitride to hexagonal boron nitride is approximately 2:1.

* * * * *

UNITED STATES PATENT AND TRADEMARK OFFICE
CERTIFICATE OF CORRECTION

PATENT NO. : 5,326,380
DATED : July 5, 1994
INVENTOR(S) : Xian Yao; Ghanshyam Rai It is certified that error appears in the above-indentified patent and that said Letters Patent is hereby corrected as shown below:

Column 2, line 40, before "resistance" change "were" to -- wear --.

Column 3, line 11, change "cBn" to -- cBN --.

Column 8, line 31, change "AIN" to -- AlN --.

Column 9, line 32, change "AIN" to -- AlN --.

Column 12, line 14, change "claim 1" to -- claim 10 --

Signed and Sealed this

Thirteenth Day of December, 1994

Attest:

BRUCE LEHMAN

*Attesting Officer*  *Commissioner of Patents and Trademarks*